O. G. VOLD.
SPEED CONTROL DEVICE.
APPLICATION FILED JAN. 24, 1920.

1,346,071.

Patented July 6, 1920.
4 SHEETS—SHEET 1.

Inventor
Ole G. Vold
By Orwig & Bair
Attorneys

O. G. VOLD.
SPEED CONTROL DEVICE.
APPLICATION FILED JAN. 24, 1920.

1,346,071.

Patented July 6, 1920.
4 SHEETS—SHEET 2.

Witness
K. Patterson

Inventor
Ole G Vold
By Orwig & Bair
Attorneys

O. G. VOLD.
SPEED CONTROL DEVICE.
APPLICATION FILED JAN. 24, 1920.

1,346,071.

Patented July 6, 1920.

Witness
K. Patterson

Inventor
Ole G. Vold
By Orwig & Bair Attorneys

UNITED STATES PATENT OFFICE.

OLE G. VOLD, OF FOREST CITY, IOWA.

SPEED-CONTROL DEVICE.

1,346,071.     Specification of Letters Patent.     Patented July 6, 1920.

Application filed January 24, 1920. Serial No. 353,896.

*To all whom it may concern:*

Be it known that I, OLE G. VOLD, a citizen of the United States, and a resident of Forest City, in the county of Winnebago and State of Iowa, have invented a certain new and useful Speed-Control Device, of which the following is a specification.

An object of my invention is to provide a speed control device of simple, durable and inexpensive construction.

More particularly it is my object to provide a tire injuring means placed in the path of travel of a vehicle and adapted to be operated by the vehicles when they are traveling faster than a predetermined rate of speed.

Still a further object is to provide a tire injuring means concealed in the road of a highway, and having a mechanism operatively connected therewith for rendering the tire injuring means operative, the mechanism being designed to be actuated by a rapidly moving vehicle.

Still a further object is to provide a tire injuring means concealed below the upper surface of the road, and having a cover member mounted over it, and mechanisms placed at spaced intervals in the road, and adapted to be operated by a traveling vehicle for causing the closure member to be moved to such position, where the tire injuring means would be operative.

Still a further object is to provide means whereby it is necessary for all of the actuating mechanisms to be in a certain position, before the device may be operated.

Still a further object is to provide adjustable means, whereby the cut or injury to the tire may be great or small as desired.

Another object of my invention is to provide means whereby the tire injuring device may be rendered inoperative.

Another object of my device is to provide a plurality of tread engaging devices, which are adapted to be moved by a vehicle, the tread engaging devices being so adapted that if they are successively engaged at a faster than a predetermined rate of speed, the tire injuring means will become operative, but if they are not engaged at faster than a predetermined rate of speed, the vehicle may travel over the road without any injury to the tires whatsoever.

Still a further object is to provide adjustable means, whereby the device may be operated by vehicles traveling at various predetermined rates of speed.

Still a further object is to provide a tire-injuring means, and a plurality of spaced tread engaging devices, spaced at either side of the means, either set of the tread engaging devices being adapted to operate only when the vehicle travels over them in a certain predetermined direction.

Another object of my device is to provide a tire injuring means and mechanism spaced in the path of travel of the vehicle for rendering the tire injuring means operative, and a cover member over the tire injuring means, which conceals the device, when it is in operative position, and forms a runway for the vehicle, after the tire injuring means have engaged the pneumatic tire of the vehicle.

Still a further object is to provide such a device, which may be readily adjusted, so that vehicles traveling over a certain road faster than a predetermined speed will have their tires injured, the device remaining inoperative so long as the vehicle moves over it at less than the predetermined speed limit.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Referring to the accompanying drawings, I have used the reference numeral 10 to indicate the ordinary highway or road.

Spaced on either side of the road are the curbings 11.

The device is adapted to be used on such highways, where the road beds are of brick or other suitable kinds of pavement.

Placed in the roadway 10 are the tire injuring means A and B. The tire injuring means A, which will be more fully set forth hereafter, are adapted to be operated by the tread engaging devices C, D, and E.

When a vehicle traveling over the road 10, travels faster than a certain predetermined speed, the engagement of the vehicle with the tread devices E, D, and C will cause the tire injuring means A to be rendered operative and puncture the pneumatic tires of the vehicle.

Figures 1, 2:
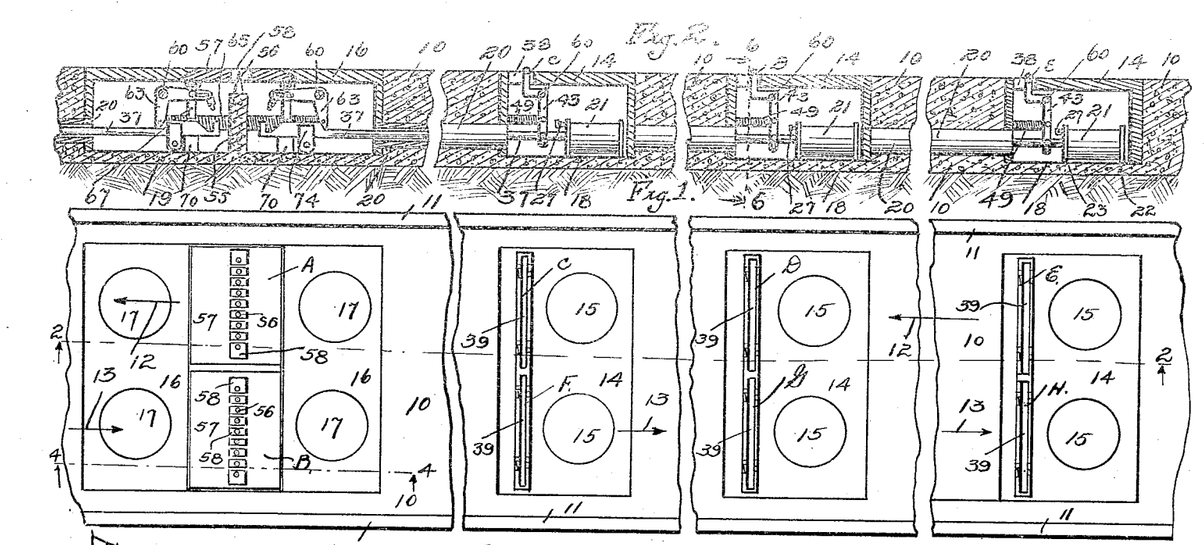
Figure 1 shows a top or plan view of a portion of the road with my improved device installed thereon, showing the spaced tread devices on only one side of the tire injuring devices.
Fig. 2 shows a central, sectional view taken on the line 2—2 of Fig. 1, the parts between the tread devices being broken, so as to indicate that there is a considerable amount of distance between each of them.

It will be seen that in Fig. 1 of the drawings, two tire injuring means or devices are shown. I provide this, so that when the vehicle is traveling in the direction indicated by the arrow 12, the tire injuring means A will be operated, and when the vehicle travels in the direction indicated by the arrow 13, then the device B will be rendered operative.

It will be understood that similar tread devices are placed on either side of the tire injuring devices.

The tread engaging devices F, G, and H are operatively connected with the tire injuring means B, but of course, it will be seen that when the car or vehicle is traveling in the direction indicated by the arrow 13, the last described tread engaging devices will not in any way tend to operate the tire injuring means.

I provide the last described tread devices solely for the purpose, so that if a driver of a vehicle travels at a fast rate of speed on the left or wrong side of the road, he will not avoid the effect of my device.

When a car is traveling on the road at less than the predetermined speed limit of that road, he may pass over the tire injuring means without in any way injuring his tire, but if he should be traveling at a high rate of speed, then the tire would be punctured by my device.

Each of the tread devices are mounted in a casing 14, which are embedded in the road, the upper surfaces of which lie flush with the upper surface of the road 10.

A closure device 15 is mounted in each of the casings 14, whereby access may be had into the casing for adjusting or changing any of the mechanisms in the casing.

The entire injuring device is mounted in the road within the casing member 16. The casing member 16 is also provided with closure devices 17, whereby access may be had into the casing 16 for adjusting or changing any of the parts therein.

Each of the casings 14 are provided with a base 18, preferably made of concrete. A base 19 is also provided below the casing 16 and forms a means whereby the entire injuring device may be rigidly supported.

Tubes 20 extend below the upper surface of the road and connect the casings 14 with the casing member 16.

Figure 3:
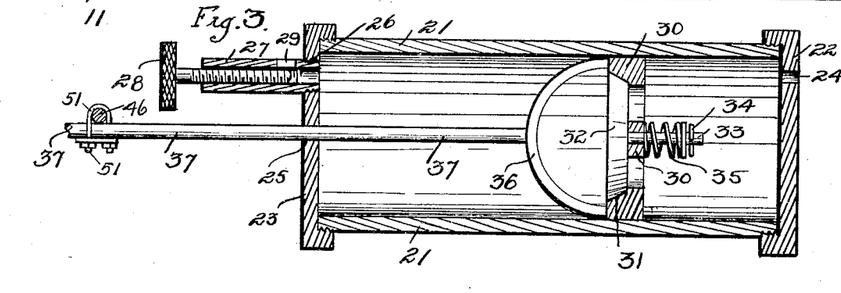
Fig. 3 shows an enlarged, central, sectional view through the valve mechanism.

Mounted in each of the casing members 14 is the valve member 21. The valve member 21 is provided with caps or end members 22 and 23. The cap or end member 22 is provided with a small opening 24. The forward closure member 23 is provided with an opening 25, and is also provided with a screw-threaded opening 26. Mounted in the screw-threaded opening 26 and extending forwardly from the valve member 21 is the tube 27. The tube 27 is internally screw-threaded and is adapted to receive the adjusting screw member 28.

The tube 27, which is mounted in the screw-threaded opening 26, is provided with an opening 29.

Slidably mounted within the valve member 21 is the piston 30. The piston 30 is provided with a valve seat 31 and a valve 32. Extending rearwardly from the valve 32 and through the piston 30 is the rod 33. Near the free end of the rod 33, I provide a pin 34.

Spaced between the pin 34 and the piston 30 is a coil spring 35. The coil spring 35 will tend to yieldingly hold the valve 32 in its seat. Secured to the forward side of the piston 30 is the yoke 36, to which is fastened the actuating rod 37. The rod 37 extends through the opening 25.

From the description of the valve heretofore described, it will be seen that when the actuating rod 37 is suddenly pushed rearwardly, it will push the piston 30; the air in that side of the valve 21 not having time enough to escape through the opening 24 will cause the valve 32 to be yieldingly lifted or pushed forwardly from its seats and permit the air, which was on the back side of the piston 30 to pass through the valve into the forward end.

As soon as the rod 37 has been pushed rearwardly to its limit, the valve 32 will immediately become seated in its seat 31, and prevent any air from the forward side of the valve 21 from passing into the rear end.

Each of the casings 14 is provided in its upper surface with an elongated slot or opening 38. The upper ends of the tread engaging devices extend through the openings 38. Each of the tread engaging devices is provided with a transverse bar 39, which extends slightly above the upper surface of the road 10, and which is adapted to be engaged and pushed forwardly when the vehicles travel over it.

Figure 6:
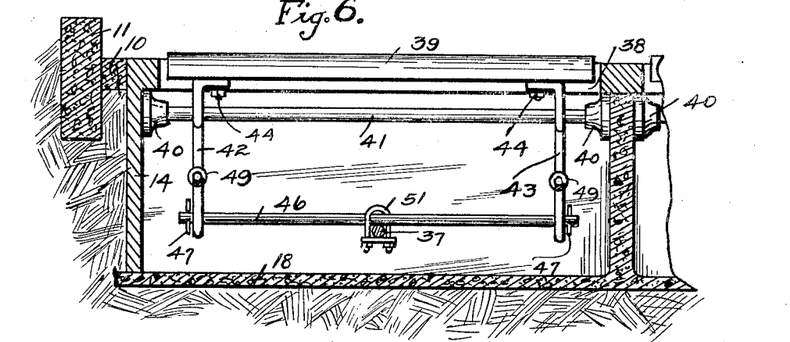
Fig. 6 shows a transverse, central, sectional view taken on line 6—6 of Fig. 2, showing the tread device, which operates the tire injuring device.

Secured to the inner walls of the casings 14 are the bearings 40. Rotatably mounted in the bearings 40 is the transverse shaft 41. Fixed to the shaft 41 are the spaced bell crank levers 42 and 43. Each of the levers is secured to the transverse bar 39 by means of the bolts 44. At the lower end of each of the bell crank levers is a slot 45. Slidably mounted within the slots 45 is the bar 46. The bar 46 is provided at each end with locking pins or cotter-pins 47, which prevent any accidental displacement of the bar 46 relative to the bell crank levers.

Each of the levers 42 and 43 are provided with a small opening 48 in which is fastened one end of the coil spring 49. The other end of the coil spring 49 is secured to the wall of the casing 14 at 50.

Figure 7:
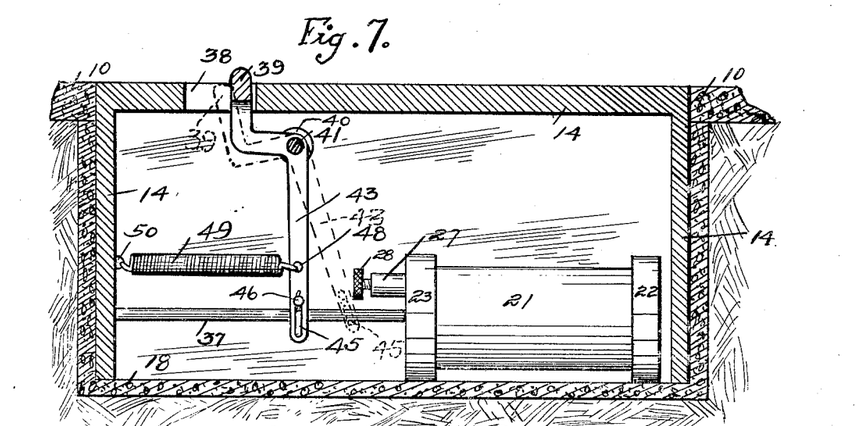
Fig. 7 shows a side view of the valve and tread engaging devices, the tread engaging devices being shown in dotted lines, showing the position in which it is, after it has been operated.

From the construction of the tread engaging devices, it will be seen that when the vehicle wheel engages the bar 39, it will cause the tread engaging devices to be moved to position shown in dotted lines in Fig. 7 of the drawings.

The rod 46 which is mounted in the levers 42 and 43, near their lower ends, is clamped or fixed to the actuating rod 37 by means of the U-bolt 51.

From the description of the foregoing, it will be seen that when the tread engaging device is moved to the position shown in dotted lines in Fig. 7 of the drawings, it will cause the actuating rod 37 to be moved rearwardly, and thus cause the piston 30 to move within the valve 21.

The slot 45 takes care of the pivotal movement of the bell crank levers when they are moved.

In order to return the levers to their original position, the spring 49, which is a coil spring will pull the lower end of the lever forwardly.

It is very essential that the levers should be moved forwardly at a certain predetermined rate of speed, and for that purpose, it is necessary to provide some means, whereby the speed of the return movement of the levers can be regulated as desired. For this purpose, I have provided the screw 28 and the opening 29 in the tube 27.

It will be seen that by rotating the screw, I am able to close the opening 29 or permit it to be wide open, as desired, and in this way regulate the speed at which the piston 30 will be drawn back to its original position by the coil spring 49. It will be seen that by having the opening 29 wide open, the air in the forward end of the valve 21 will pass out quickly and thereby permit the spring to pull the piston back to its original position very quickly, but if the screw 28 is moved to such position, that it will partially close the opening 29, then the return movement of the piston will be very gradual.

Each of the actuating rods 37 is provided at their forward end with an enlarged portion 52. A notch 53 is provided within the portion 52. Between the main portion 52 and the notch 53 is the beveled or inclined surface 54.

Each of the actuating rods 37 extends through the tubes or pipes 20.

Formed on the base 19 is the vertical supporting member 55, which has a plurality of pointed or tire puncturing pins 56 rigidly mounted on its upper edge.

The casing 16 is provided in its upper surface directly above the pointed members 56 with a movable cover member 57. The cover member 57 is provided with a series of openings 58. Each opening is designed to be directly above one of the pointed members 56. When the cover member 57 is in its inoperative position, that is the position shown in solid lines in Fig. 4 of the drawings, the pointed members 56 will not extend on through the opening, but merely into the opening; but when the cover member is moved to the position shown in dotted lines in Fig. 4 of the drawings, then the members 56 will extend on through the openings 58.

The casing 16 is provided with the bearings 59. Mounted in the bearings 59 is the horizontal shaft 60. Fixed to the shaft 60 and adapted to rotate with it are the links 61. The links 61 are each adapted to be spaced adjacent to the bearings 59. The links 61 are provided with elongated slots 62 near their forward ends.

Mounted between the links 61 and fixed to the shaft 60 in the bell crank lever 63. The bell crank lever 63 is provided with a slot 64 in its forward end, the purpose of which will be more fully set forth.

Fixed to the lower end of the bell crank lever 63 is the coil spring 65. The movable cover member 57 is provided with downwardly extending ears 66. Supporting bars 67 are pivoted to the ears 66. Fixed to the supporting bars 66 between their ends is a cross-piece 68. Extending upwardly from the center of the cross-piece 68 is a short supporting rod 69, which is also pivoted to the center ear 66 at its upper end.

The lower ends of the supporting rod 67 are mounted in the guides 70. The links 62 are secured at their forward ends to the supporting bars 67, while the bell crank lever 63 is secured at its forward end to the supporting bar 69.

From the construction of the parts just described, it will be seen that the cover member 57 is yieldingly held in its raised position by means of the spring 65; that is the spring 65 pulling on the end of the bell crank 63 will tend to force the supporting rods upwardly and thus hold the cover in its raised or inoperative position.

It will be understood that the supporting bars are mounted on each side of the tire engaging pointed members, and that by providing two springs and two sets of the supporting bars, that is one on each end, the cover member will always be yieldingly held in its raised position. The edges of the cover member 57 are beveled at 71.

The upper surface of the casing 16 is also beveled, so that the pulling inwardly on the springs will tend to force the cover member to rest tightly against the beveled surface of the casing 16.

In order to make it possible to drive a vehicle over the cover member 57 without the danger of forcing it downwardly, I have provided suitable means for locking the cover member in its raised position, so long as the automobile or vehicle traveling over the road does not exceed a certain speed limit; but when the speed limit exceeds a predetermined rate, then the cover member will be moved downwardly by the weight of the passing vehicle, and cause the tire to become engaged with the pointed members 56 and become punctured.

In order to lock the cover member in its raised position, the portion 52 of the actuating rods 37 is placed directly below the cross-piece 68. It will be seen that by providing some means below the bar 68, it would be absolutely impossible to move the cover member downwardly.

Fixed on the base 19 are the upright bearing members 72. Fixed within the bearing members 72 is the shaft 73. Fixed to the shaft 73 are the spaced guide devices 74 for guiding the actuating rods 37. Rotatably mounted on the shaft 73 and between each of the guide devices 74 is the roller 75.

The under surface of each of the actuating rods rests upon the rollers 75, while the guide devices 74 tend to keep the actuating rods in their proper position.

From the description of the parts just described, it will be seen that when the tread devices are engaged, the actuating rods 37 will be pushed rearwardly until the notch 53 becomes directly below the cross-piece 68. When the device is in this position, it will be seen that the spring will then hold the cover member 57 in its raised position, but if any amount of weight were then placed upon the cover member 57, it would immediately be moved to the position shown in dotted lines in Fig. 4 and render the tire injuring means operative.

It will also be noted that the device is adapted to only operate one side at a time; that is when the vehicle travels in a certain predetermined direction, it will engage the tread devices, and cause that side of the device to lower, while the ears 66 and the supporting bars 67 and 69 on the other side of the closure member will form a pivot or hinged member, whereby the cover member may be moved downwardly.

As soon as the vehicle has passed over the cover member 57, the spring 65 will immediately return the cover to its original or inoperative position, while the springs 49 will return the actuating rods to such position, where the portion 52 will rest directly below the cross-piece 68, and render the device inoperative regardless of the weight that is placed upon the cover member 57.

The cover member 57 will be operated by the tread engaging devices, which are placed on either side of the cover. When the tread engaging devices adjacent to one side of the cover are engaged at a faster than a predetermined rate of speed, then that side of the cover member will be moved downwardly by the weight of the traveling vehicle and cause the tire to be punctured. The end of the cover 57, which does not lower, but acts as a pivot or a hinge, so that the other side may lower, will provide an inclined surface or runway upon which the vehicle wheels may travel, and again come upon the road surface.

The tread engaging devices, which have been heretofore described are spaced at various intervals in the road. For example, the devices are spaced say approximately one hundred yards apart, that is from the tire injuring means to the farthest tread engaging device, there would be a distance of three hundred yards. In order to best explain the timing and operation of my device, I will refer to the tread engaging devices E, D, and C and the tire injuring means A. If an automobile was traveling in the direction indicated by the arrow 12 over the tread device at approximately twenty miles per hour, the device will be inoperative, but if it were traveling faster than the above speed, it would be operative.

If the speed limit over the certain road was twenty miles per hour, and the distance between the tread device E and the tire injuring means A was three hundred yards, then the valve 21 of the tread device E would be so adjusted that it would take thirty seconds for it to operate and the valve 21 of the tread device D would be adjusted so that it would operate in twenty seconds, while the valve 21 of the tread device C would operate in ten seconds. My device is so adapted that it will only operate when the distance between the tread device E and the tire injuring means A is covered by the vehicle in less than thirty seconds, if the speed limit were twenty miles per hour.

From the construction of the parts heretofore described, it will be noted that in order to have the supporting bars 67 and 69 drop from their raised position, it is necessary for each of the portions 52 of the actuating rods 37 to be withdrawn or moved to such position that the notches 53 of the actuating bars 37 will be directly below the cross-piece 68.

When the device is in this position and weight is placed upon the cover member 57, the spring will not have enough tension to counteract the weight, and thus the cover member will be moved downwardly and the tire injuring means will then extend through the cover and engage with the tires of the vehicle as it passes over it.

In this connection, it will be noted that it is necessary for all of the actuating rods to be moved to such position, where the notch 53 will be directly below the cross-piece 68. For example, if the actuating rod from the tread device C is not in such position that the notch 53 will be directly below the cross-piece 68, and the actuating rods of the tread devices D and E are in such position that the portion 52 is below the cross-piece 68, then the device would not operate, because the cover would be supported by the remaining two actuating rods of the tread devices D and E.

When the tread device E is operated by a passing vehicle at a faster than a predetermined rate of speed, it will be seen that the actuating rod will not have time enough to return to the position where the portion 52 will rest directly below the cross-piece 68. The same will be true with the tread devices D and C. When the car has operated all three of the tread devices at a faster than a predetermined rate of speed, then all three of the notches 53 of the actuating rods 37 will be directly below the cross-piece 68, and permit the cover member 57 to be moved downwardly and render the tire injuring means operative.

If, however, the vehicle strikes the tread device E at a speed faster than the predetermined speed, but slows down when he comes to the tread devices D and C, until he is far below the speed limit of the road, it will give the tread devices C and D time to come back to their original position, that is the position where the portion 52 rests directly below the cross-piece 68 before the vehicle has passed over the tire injuring means.

I have provided several of the tread devices to actuate the tire injuring means solely for the purpose to injure the tires of the continued speeder, and by this arrangement of a plurality of tread devices, it is necessary that the vehicle strikes all of them at a faster than a predetermined rate of speed; otherwise it will give the devices time enough to get back to their original or inoperative position, and holds the cover member against any movement whatsoever.

By adjusting the screw-threaded member 28 of the valve 21, I am able to regulate the length of time that it will take for my device after it is operated to come back to its original or inoperative position, and in this way, I am able to exactly control the operation of the tire injuring means.

It will also be understood that my device or tire injuring means could be operated effectively if only two of the tread devices were used, and it could also be operated with more than the number shown in the drawings. The purpose of using more than two was to get the device to operate only upon vehicles that were being driven continuously at a fast rate of speed.

By placing the tread devices at greater intervals and by regulating the valves 21, so as to operate accordingly, it would mean that in order to injure the tires of a vehicle, it would be necessary for that vehicle to travel quite a distance always at the fast rate of speed, in order to render the tire injuring means operative.

My tire injuring means is provided with a suitable stop device or limiting device, whereby the depth of the cut in the tire may be varied.

Figures 8, 10:
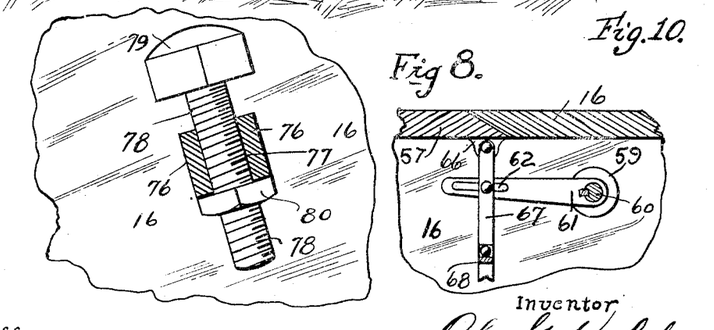
Fig. 8 shows an enlarged, detailed view of the adjustable stop devices for limiting the cut, which will be made by the tire injuring device.
Fig. 10 shows a central, sectional view taken on the line 10—10 of Fig. 9, showing the end link members.
Figure 9:
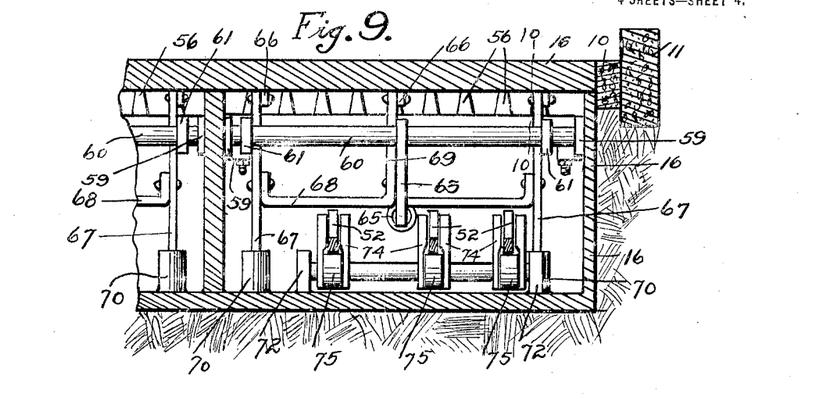
Fig. 9 shows a central, sectional view taken on the line 9—9 of Fig. 4.

Mounted on the walls of the casing 16 are the lugs 76. The lugs 76 are provided with an internally screw-threaded opening 77. Mounted within each of the screw-threaded openings 77 is the bolt 78, which is provided with a rounded head 79. Screw-threaded onto the bolt 78 and near its lower end is a nut 80, which serves as a lock nut for holding the bolt 78 in any of its positions; that is when the bolt 78 is raised or lowered within the screw-threaded opening 77 of the lug 76, then the nut 80 is tightened until it rests snugly against the under or lower side of the lug 76, and will thus hold the bolt 78 against any possible movement.

From the description of the stop device, which is best illustrated in Fig. 8 of the drawings, it will be seen that by raising or lowering it, I am able to regulate the amount of drop or movement of the cover member 57. I am also able to rotate the bolt 78 until it will hold the cover member 57 against any movement whatsoever, and will serve as a means for rendering the cover member and tire injuring means absolutely inoperative.

The cover member 17 of the casing 16 serves as an access for getting into the casing 16 to operate the limiting device.

Figure 11:
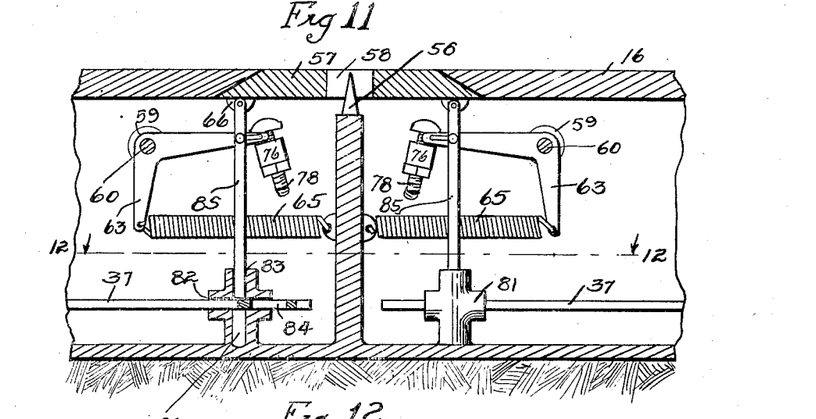
Fig. 11 shows a side elevation of a modified form of a tire injuring device, parts being broken away and shown in section, in order to better illustrate the construction.
Figure 12:
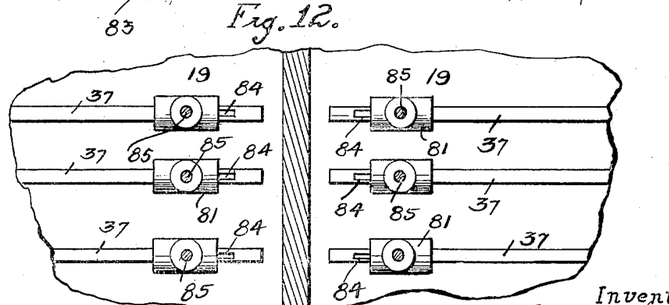
Fig. 12 shows a sectional view taken on line 12—12 of Fig. 11.

In Figs. 11 and 12, I have shown a slightly modified form of the supporting means of the tire injuring device. In this form of the device, I have shown the casing 16 and the base 19, similar to the ones shown in Fig. 4 of the drawings. Formed on the base 19 of the modified form of my device are the guide members 81, which have a horizontal opening 82 and a vertical opening 83 therein.

Slidably mounted within the opening 82 is the end of the actuating rod 37. The ends of the actuating rod 37 are each provided with an elongated slot 84. When the actuating rods are operated by the tread devices, they will be moved to such position where the opening 84 will register with the opening 83 of the guide 81.

In this form of my device, I have shown supporting rods 85, which are pivoted to the ears 66 of the closure member 57. The supporting rods 85 are so designed that they will lower and rest against a portion of the actuating rods 37.

When the rods 37 are moved to such position where the opening 84 will register with the opening 83, then the supporting bar will be free to move through the opening 84 and thus permit the cover member 57 to be moved downwardly until the tire injuring means are rendered operative.

It will be understood that it is necessary for all three of the actuating rods 37 to be in the same position; that is all of the openings 84 must be in line with all of the openings 83, in order to permit the cover member 57 to be moved downwardly and operated.

Figure 4:
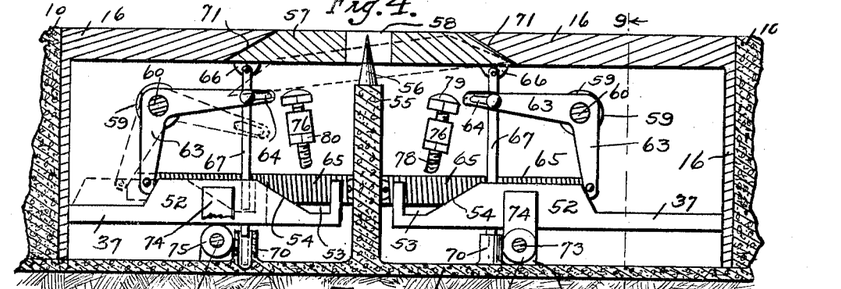
Fig. 4 shows an enlarged, central, sectional view taken on the line 4—4 of Fig. 1, showing in detail the construction of the tire injuring device.
Figure 5:
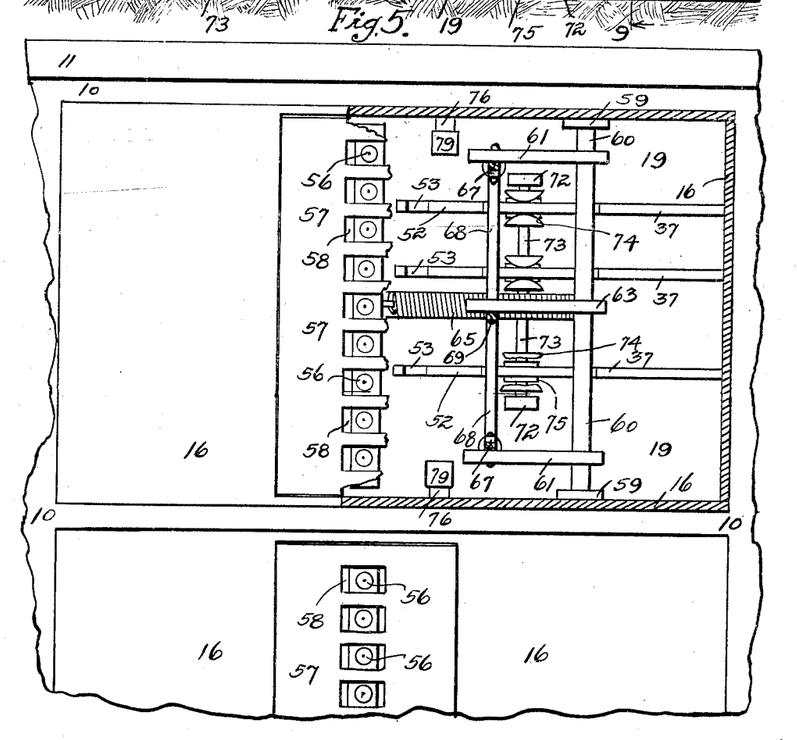
Fig. 5 shows a top or plan view of the same, parts being broken away to better illustrate the construction.

The spring 65 as shown in Fig. 11 is similar to the spring 65 shown in Fig. 4, and will tend to yieldingly hold the cover member 57 in its raised position, even though the openings 84 are in alinement with the supporting bars 85, so long as no weight is placed upon the cover member.

From the description of my modified form of my device, it will be noted that it is necessary for all three of the actuating rods to be in the same position in order to render the tire injuring means operative.

One of the advantages of my device is that when once installed upon the road, it may be readily and easily adjusted, so that the speeds of the road may be varied in accordance with the location of the certain road.

It is known to be a fact that in some localities the speed limit is fifteen miles an hour, while in others it is twenty and twenty-five. The location of the road or highway must be taken into consideration before the speed limit for that road is fixed.

With my device, I am able to adapt it to any road by merely changing the position of the adjustable valve members 21. I am also able to place the tread devices at various intervals by merely adjusting the valves to take care of any of the variations, which are desired.

By placing suitable warning signs along the side of the road, it will give the driver a chance to know that if he were traveling faster than the speed limit as provided, it would be likely that his tires would be punctured or injured. If a driver of a vehicle would not heed the signs and traveled at a fast rate of speed, he would then have to suffer the consequences of having his tires injured.

With my device installed on the country roads, especially the permanent roads which are of pavement, it would eliminate a great number of accidents which are caused by reckless speeding.

With the improved road conditions, that is the permanent paving of the roads between cities especially in the country, it has made it possible for automobiles to travel over smooth surfaces and good pavement at a high rate of speed, contrary to the law and public policy.

I believe that my device when once installed upon the road, as soon as the public became acquainted with the danger which would be done to their tires, if they exceeded the speed limit, careful and moderate driving would soon be the result.

Another advantage of my device is that I am able to regulate and adjust the movement of the cover member to such position, whereby the vehicle may travel over it without any danger of having the tire injured, regardless of the speed. By so providing, anyone even familiar with the road and the location of my device would not know when it would be operative or when it would be inoperative, and the effect would be that rather than take any chance of having their tires punctured, the drivers of the vehicles would travel at the prescribed speed of the road.

Some changes may be made in the construction and arrangement of the parts of my device without departing from the essential features and purposes of my invention, and it is my intention to cover by my claims any modified forms of structure or use of mechanical equivalents, which may be included within their scope.

I claim as my invention:

1. In a device of the class described, means mounted in the road for injuring a tire, and mechanism adapted to be operated by a rapidly moving vehicle for making said means operative.

2. In a device of the class described, means mounted in the road for injuring a tire, and mechanism adapted to be operated by a rapidly moving vehicle for making said means operative, said mechanism being adjustable to be operated by vehicles traveling at various predetermined speeds.

3. In a device of the class described, means mounted in the road for injuring a tire, and mechanism adapted to be operated by a vehicle traveling above a predetermined speed for making said means operative.

4. In a device of the class described, means for injuring a tire, and mechanism adapted to be operated by a vehicle traveling above a predetermined speed for making said means operative, said mechanism including spaced devices arranged in the path of such a vehicle and means for connecting said devices with said means, whereby when the devices are engaged by a vehicle in sufficiently rapid succession, said means is made operative.

5. In a device of the class described, means mounted in the road for injuring a tire, and mechanism adapted to be operated by a vehicle traveling above a predetermined speed, for making said means operative, and means for returning the parts to inoperative position after operation.

6. In a device of the class described, means adapted to be operated by a vehicle traveling at a predetermined speed, for injuring the vehicle, said last means being mounted in the road.

7. In a device of the class described, means adapted to be operated by a vehicle traveling at a predetermined speed, for injuring the vehicle, said last means being mounted in the road and arranged to move to inoperative position after such a vehicle has passed.

8. In a device of the class described, means for injuring the tires of a vehicle traveling at faster than a predetermined speed, said last means being mounted in the road, and mechanism adapted to be operated by the vehicle for making said last means operative.

9. In a device of the class described, means for injuring the tires of a vehicle traveling at faster than a predetermined speed, mechanism adapted to be operated by the vehicle for making said last means operative, said last mechanism comprising a device arranged in the path of such vehicle.

10. In a device of the class described, means for injuring the tires of a vehicle traveling at faster than a predetermined speed, mechanism adapted to be operated by the vehicle for making said last means operative, said last mechanism comprising a plurality of spaced devices arranged in the path of such vehicle.

11. In a device of the class described, means mounted in the road for injuring the tires of a vehicle traveling at faster than a predetermined speed and mechanism adapted to be operated by the vehicle traveling in either direction, for making said last means operative.

12. In a device of the class described, means mounted in the road for injuring the tires of a vehicle traveling at faster than a predetermined speed, mechanism adapted to be operated by the vehicle traveling in either direction, for making said last means operative, and means for returning said first described means to inoperative position after such vehicle has passed.

13. A speed limiting device adapted to be placed in the road of a highway and to be operated by a vehicle traveling at a speed greater than a predetermined speed, comprising tire injuring means concealed below the road and spaced devices whereby said last means may be rendered operative.

14. A speed limiting device adapted to be placed in the road of a highway and to be operated by a vehicle traveling at a speed greater than a predetermined speed, comprising tire injuring means concealed below the road, and a plurality of spaced devices for rendering said last means operative, said devices being so designed that all must be in a certain predetermined position before the tire injuring means will be rendered operative.

15. A speed limiting device adapted to be placed in the road of a highway and to be operated by a vehicle traveling at a speed greater than a predetermined speed, comprising tire injuring means concealed below the road, a plurality of spaced devices for rendering said last means operative, said devices being so designed that all must be in a certain predetermined position before the tire injuring means will be rendered operative, and means for rendering said tire injuring means inoperative after it has been rendered operative.

16. A speed limiting device adapted to be placed in the road of a highway and to be operated by a vehicle traveling at a speed greater than a predetermined speed, comprising tire injuring means concealed below the road and spaced devices whereby said last means may be rendered operative, said devices being adjustable so that the tire injuring means may be operated by vehicles traveling at various predetermined speeds.

17. In a device of the class described, means for injuring the tires of a vehicle traveling faster than a predetermined speed and means designed to be operated by such vehicle for rendering said first described means operative, said last described means comprising devices placed in the path of travel and designed to be moved by the vehicle, means for returning said devices to their original position in a predetermined time for rendering the tire injuring means inoperative.

18. In a device of the class described, means for injuring the tires of a vehicle, traveling faster than a predetermined speed, said means being concealed below the surface of the road, a cover member over said means, and means for rendering said first described means operative, said last described means comprising devices placed in the path of travel of the vehicle and adapted to be moved by it for rendering the tire injuring means operative.

19. In a device of the class described, means for injuring the tires of a vehicle, traveling faster than a predetermined speed, said means being concealed below the surface of the road, a cover member over said means, and means for rendering said first described means operative, said last described means comprising devices placed in the path of travel of the vehicle and adapted to be moved by it, and means for returning said devices to their original position in a predetermined time for rendering the tire injuring means inoperative.

20. In a device of the class described, means for injuring the tires of a vehicle traveling faster than a predetermined speed, said means being concealed below the surface of the road, a cover member over said means, and means for rendering said first described means operative, said cover member being provided with openings through which the tire injuring means is adapted to extend when the device is operated.

21. In a device of the class described, means for injuring the tires of a vehicle, traveling faster than a predetermined speed, said means being concealed below the surface of the road, a hinged cover member over said means, means for normally holding said cover member in its inoperative position, and means adapted to be actuated by the vehicle for permitting said cover member to be operated, whereby the tire injuring means will be rendered operative.

22. In a device of the class described, means for injuring the tires of a vehicle traveling faster than a predetermined speed, said means being concealed below the surface of the road, a hinged cover member provided with openings placed over said means, and means adapted to be actuated by the vehicle for permitting said cover member to be moved to such position that the tire injuring means will extend through the openings and injure the tires of the vehicle passing over it.

23. In a device of the class described, means for injuring the tires of a vehicle, traveling faster than a predetermined speed, said means being concealed below the surface of the road, a hinged cover member provided with openings placed over said means, means adapted to be actuated by the vehicle for permitting said cover member to be moved to such position that the tire injuring means will extend through the opening and injure the tires of the vehicle passing over it, and means for returning the parts to their inoperative position.

24. In a device of the class described, means for injuring the tires of a vehicle traveling faster than a predetermined speed, said means being concealed below the surface of the road, a hinged cover member provided with openings placed over said means, means adapted to be actuated by the vehicle for permitting said cover member to be moved to such position that the tire injuring means will extend through the openings and injure the tires of the vehicle passing over it, and means for returning said hinged member to its inoperative position and for locking it.

25. In a device of the class described, means for injuring the tires of a vehicle traveling faster than a predetermined speed, said means being placed in the path of travel of the vehicle, a cover member placed over said means and adapted to lie flush with the upper surface of the road, spaced devices placed in the path of travel of the vehicle, said devices being designed if they are engaged in sufficiently rapid succession to permit the cover member to be moved to such position by the passing vehicle that the tire injuring means will come in contact with the tires of the vehicle.

26. In a device of the class described, means for injuring the tires of a vehicle traveling faster than a predetermined speed, said means being placed in the path of travel of the vehicle, a cover member placed over said means and adapted to lie flush with the upper surface of the road, spaced devices placed in the path of travel of the vehicle, said devices being designed if they are engaged in sufficiently rapid succession to permit the cover member to be moved to such position by the passing vehicle that the tire injuring means will come in contact with the tires of the vehicle, and means for returning said cover member to its inoperative position after such vehicle has passed.

27. In a device of the class described, means for injuring the tires of a vehicle, traveling faster than a predetermined speed, said means being placed in the path of travel of the vehicle, a cover member placed over said means, and adapted to lie flush with the upper surface of the road, spaced devices placed in the path of travel of the vehicle, said devices being designed if they are successively engaged by a vehicle traveling faster than a predetermined speed, to permit the cover member to be moved by the passing vehicle to such position that the tire injuring means will be rendered operative.

28. In a device of the class described, means for injuring the tires of a vehicle, traveling faster than a predetermined speed, said means being placed in the path of travel of the vehicle, a cover member placed over said means and adapted to lie flush with the upper surface of the road, spaced devices placed in the path of travel of the vehicle, said devices being designed if they are successively engaged by a vehicle traveling faster than a predetermined speed to render said tire injuring means operative, and said devices being adjustable so that vehicles traveling at various predetermined speeds will cause said tire injuring means to be rendered operative.

29. In a device of the class described, means for injuring the tires of a vehicle traveling faster than a predetermined speed, said means being placed in the path of travel of the vehicle, a cover member placed over said means and adapted to lie flush with the upper surface of the road, spaced devices placed in the path of travel of the vehicle, said devices being designed if they are successively engaged by a vehicle traveling faster than a predetermined speed in a predetermined direction to render said tire injuring means operative.

30. In a device of the class described, means for injuring the tires of a vehicle traveling faster than a predetermined speed, said means being placed in the path of travel of the vehicle, a cover member placed over said means and adapted to lie flush with the upper surface of the road, spaced devices placed on either side of said tire injuring means and adapted to be actuated by vehicles traveling in predetermined directions for rendering said tire injuring means operative, the devices on one side being adapted to render said tire injuring means operative independently of the position of the devices on the other side.

31. In a device of the class described, a tire injuring means mounted below the surface of a road, said tire injuring means comprising pointed members rigidly supported, a hinged cover member adapted to lie flush with the upper surface of the road and provided with openings, said openings being designed to register with said pointed members, means placed in the road and adapted to be actuated by a vehicle for permitting said hinged cover member to be moved, means for returning said last means to their original positions after operation, and means for returning said cover member to its original position after such vehicle has passed over it.

32. In a device of the class described, a tire injuring means mounted below the surface of a road, said tire injuring means comprising pointed members rigidly supported, a hinged cover member adapted to lie flush with the upper surface of the road and provided with openings, said openings being designed to register with said pointed members, spaced devices placed in the road and adapted to be actuated by a vehicle for rendering the tire injuring means operative, means for returning said devices to their original positions, and means for yieldingly holding said cover member in its inoperative position, regardless of the position of said spaced devices.

33. In a device of the class described, a tire injuring means mounted below the surface of a road, said tire injuring means comprising pointed members rigidly supported, a hinged cover member adapted to lie flush with the upper surface of the road and provided with openings, said openings being designed to register with said pointed members, spaced devices placed in the road and adapted to be actuated by a vehicle for rendering the tire injuring means operative, means for returning said devices to their original positions, and means for locking said cover member in its inoperative position, when said devices are in their original position.

34. In a device of the class described, means for injuring the tires of a vehicle traveling faster than a predetermined speed, said means being placed in the path of travel of the vehicle, a cover member placed over said means and adapted to lie flush with the upper surface of the road, spaced devices placed in the path of travel of the vehicle said devices being designed if they are engaged in sufficiently rapid succession to permit the cover member to be moved to such position by the passing vehicle that the tire injuring means will come in contact with the tires of the vehicle, and means for yieldingly holding said cover member in its inoperative position.

35. In a device of the class described, a tire injuring means mounted below the surface of a road, said tire injuring means comprising pointed members rigidly supported, a hinged cover member adapted to lie flush with the upper surface of the road, and provided with openings, said openings being designed to register with said pointed members, spaced devices placed in the road and adapted if successively engaged at faster than predetermined intervals by a vehicle to render said tire injuring means operative, said spaced devices being adjustable, whereby they may be adjusted to render said tire injuring means operative at various predetermined intervals.

36. In a device of the class described, a tire injuring means mounted below the surface of the road, a cover member over said means, a supporting bar for holding said cover in its raised position, a valve member mounted in the road, tread engaging means connected with said valve and adapted to extend up above the surface of the road, an actuating bar having one end operatively connected with said valve and the other end placed below said supporting bar, a notch in said actuating bar, whereby movement of said actuating bar will cause the supporting bar to register with said notch and thereby permit the cover member to be moved downwardly by the weight of the passing vehicle for causing the tires of the vehicle to engage the tire injuring means.

37. In a device of the class described, a tire injuring means mounted below the surface of the road, a cover member over said means, a supporting bar for holding said cover in its raised position, a valve member mounted in the road, tread engaging means connected with said valve and adapted to extend up above the surface of the road, an actuating bar having one end operatively connected with said valve and the other end placed below said supporting bar, a notch in said actuating bar, whereby movement of said actuating bar will cause the supporting bar to register with said notch and thereby permit the cover member to be moved downwardly by the weight of the passing vehicle for causing the tires of the vehicle to engage the tire injuring means, and means for returning said cover member after operation to its raised position.

38. In a device of the class described, a tire injuring means mounted below the surface of the road, a cover member over said last means, means for supporting said cover member, and tread engaging devices placed in the path of travel of a vehicle, said tread engaging devices being operatively connected with said supporting means, whereby when the tread devices are engaged by a vehicle in succession faster than a predetermined speed, the supporting means will be rendered inoperative, and permit the passing vehicle to move the cover member downwardly and thereby engage the tire injuring means.

39. In a device of the class described, a tire injuring means mounted below the surface of the road, a cover member over said last means, means for supporting said cover member, tread engaging devices placed in the path of travel of a vehicle, said tread engaging devices being operatively connected with said supporting means, whereby when the tread devices are engaged by a vehicle in succession faster than a predetermined speed, the supporting means will be rendered inoperative, and means for yieldingly holding said cover member in its raised position after the supporting means are rendered inoperative.

40. In a device of the class described, a tire injuring means mounted below the surface of the road, a cover member over said last means, means for supporting said cover member, tread engaging devices placed in the path of travel of a vehicle, said tread engaging devices being operatively connected with said supporting means, whereby when the tread devices are engaged by a vehicle in succession faster than a predetermined speed, the supporting means will be rendered inoperative and permit the passing vehicle to move the cover member downwardly and thereby engage the tire injuring means, and stop devices for limiting the downward movement of said cover member.

41. In a device of the class described, a tire injuring means mounted below the surface of the road, a cover member over said last means, means for supporting said cover member, tread engaging devices placed in the path of travel of a vehicle, said tread engaging devices being operatively connected with said supporting means, whereby when the tread devices are engaged by a vehicle in succession faster than a predetermined speed, the supporting means will be rendered inoperative and permit the passing vehicle to move the cover member downwardly and thereby engage the tire injuring means, and adjustable stop devices for limiting the downward movement of said cover member.

42. In a device of the class described, a tire injuring means mounted below the surface of the road, a cover member over said last means, means for supporting said cover member, tread engaging devices placed in the path of travel of a vehicle, said tread engaging devices being operatively connected with said supporting means, whereby when the tread devices are engaged by a vehicle in succession faster than a predetermined speed, the supporting means will be rendered inoperative, and permit the passing vehicle to move the cover member downwardly and thereby engage the tire injuring means, and means for returning said tread engaging devices to their original position after they are engaged.

Des Moines, Iowa, January 7, 1920.

OLE G. VOLD.